(12) United States Patent
Park et al.

(10) Patent No.: US 11,284,216 B2
(45) Date of Patent: Mar. 22, 2022

(54) METHOD FOR VARIABLE GEOFENCING AND ELECTRONIC DEVICE THEREOF

(71) Applicant: Samsung Electronics Co., Ltd., Gyeonggi-do (KR)

(72) Inventors: Sanguk Park, Gyeonggi-do (KR); Daeho Kang, Gyeonggi-do (KR); Jinwoo Kim, Gyeonggi-do (KR); Chaiman Lim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/904,057

(22) Filed: Jun. 17, 2020

(65) Prior Publication Data

US 2020/0404448 A1 Dec. 24, 2020

(30) Foreign Application Priority Data

Jun. 19, 2019 (KR) ........................ 10-2019-0072980

(51) Int. Cl.
*H04W 4/021* (2018.01)
*G06Q 20/32* (2012.01)

(52) U.S. Cl.
CPC .......... *H04W 4/022* (2013.01); *G06Q 20/325* (2013.01)

(58) Field of Classification Search
CPC ....... H04W 4/022; H04W 4/02; H04W 4/024; H04W 4/029; H04W 64/00; G06Q 20/325; G06Q 20/3224; G06Q 20/40155; H04L 29/08108; H04L 29/08657; H04L 29/08936
See application file for complete search history.

(56) References Cited

U.S. PATENT DOCUMENTS 9,646,318 B2 5/2017 McGavran et al.
9,807,561 B2 10/2017 Marti et al.
(Continued)

FOREIGN PATENT DOCUMENTS

KR 1020180045393 5/2018
KR 1020190100786 8/2019

OTHER PUBLICATIONS

Garzon, Sandro Rodriguez, et al. "Infrastructure-assisted geofencing: proactive location-based services with thin mobile clients and smart servers." 2015 3rd IEEE International Conference on Mobile Cloud Computing, Services, and Engineering. IEEE, 2015. (Year: 2015).*

(Continued)

*Primary Examiner* — Sharad Rampuria
(74) *Attorney, Agent, or Firm* — The Farrell Law Firm, P.C.

(57) ABSTRACT

Disclosed is a geofencing server including a memory configured to store a database including wireless fingerprint information for a point-of-interest (PoI), a communication module configured to perform communication with an electronic device, and a processor connected to the memory and the communication circuit, wherein the memory stores instructions that, when executed, cause the processor to obtain wireless network information collected at a plurality of points through the communication circuit, determine a serviceable radius based on the wireless fingerprint information and the wireless network information, and transmit a threshold value determined based on the serviceable radius to the electronic device through the communication circuit.

20 Claims, 13 Drawing Sheets

(56) References Cited

U.S. PATENT DOCUMENTS

| | | |
|---|---|---|
| 9,860,704 B2 | 1/2018 | Kapicioglu et al. |
| 10,129,694 B1 | 11/2018 | Parshin et al. |
| 10,313,829 B2 | 6/2019 | Cho et al. |
| 10,462,604 B2 | 10/2019 | Parshin et al. |
| 10,779,111 B2 | 9/2020 | Parshin et al. |
| 2013/0117155 A1 | 5/2013 | Glasgo |
| 2014/0156410 A1* | 6/2014 | Wuersch ............ G06Q 30/0261 705/14.58 |
| 2014/0337232 A1 | 11/2014 | Glasgo |
| 2015/0345969 A1 | 12/2015 | McGavran et al. |
| 2016/0295372 A1 | 10/2016 | Kapicioglu et al. |
| 2016/0360368 A1 | 12/2016 | Marti et al. |
| 2018/0115867 A1 | 4/2018 | Cho et al. |

OTHER PUBLICATIONS

Laoudias, Christos, Paul Kemppi, and Christos G. Panayiotou. "Localization using radial basis function networks and signal strength fingerprints in WLAN." GLOBECOM 2009-2009 IEEE Global Telecommunications Conference. IEEE, 2009. (Year: 2009).*
International Search Report dated Sep. 28, 2020 issued in counterpart application No. PCT/KR2020/007602, 8 pages.

* cited by examiner

610

| LOCATION COORDINATES | WIRELESS NETWORK INFORMATION | | |
|---|---|---|---|
| | MAC ADDRESS | AVERAGE RSSI | REPORT COUNT |
| 37.6, 126.9 | AA:BB:CC | -60 dBm | 291 |
| | A1:B1:C2 | -72 dBm | 285 |
| | ⋮ | ⋮ | ⋮ |

620

| POINT-OF-INTEREST INDEX | NAME | Wireless Fingerprint | $d_{TH}$ |
|---|---|---|---|
| 1 | EMART | FINGERPRINT 1 | 0.75 |
| 2 | 'BOB'S COFFEE SHOP | FINGERPRINT 2 | 0.6 |
| ⋮ | ⋮ | ⋮ | ⋮ |

FIG.6

✕ Far DETERMINATION INFORMATION ESTIMATING LOCATION
▲ Near DETERMINATION INFORMATION ESTIMATING LOCATION
● In DETERMINATION INFORMATION ESTIMATING LOCATION
★ POINT-OF-INTEREST LOCATION

METHOD FOR VARIABLE GEOFENCING AND ELECTRONIC DEVICE THEREOF

CROSS-REFERENCE TO RELATED APPLICATION(S)

This application is based on and claims priority under 35 U.S.C. § 119 to Korean Patent Application No. 10-2019-0072980, filed on Jun. 19, 2019, in the Korean Intellectual Property Office, the disclosure of which is incorporated herein by reference in its entirety.

BACKGROUND

1. Field

The disclosure relates generally to an electronic device, and more particularly, to a technique of performing geofencing for a service provided using an electronic device.

2. Description of Related Art

Various location-based services may be provided using an electronic device capable of recognizing a location, such as a mobile device. For example, when a mobile device is located adjacent to a store, the mobile device may run a service associated with the store, output an advertisement associated with the store, or send a message requesting the service or the advertisement to a server that provides the associated service or advertisement.

It is necessary to define a geographic boundary for a point-of-interest (PoI), such as a store location, so that a mobile device can perform a location-based service. For example, when a mobile device enters an area within a predetermined boundary and outputs a notification message related to a PoI, user experience with the mobile device may be improved. The geographic boundary for providing location-based services may be set as a virtual area associated with an actual place, in an operation referred to as a geofencing method. The geofence may be a virtual parameter for a real-world geographical area dynamically generated for a geographic location.

In addition, the mobile device needs to measure its' location for determining whether the mobile device has entered the geofence to perform the location-based service. Accurate positioning of the mobile device is required so that mobile device may provide a suitable location-based service. A representative method for measuring a position of a mobile device is a global positioning system (GPS) that uses signals received from satellites.

However, the GPS consumes a substantial amount of power and has difficulty in performing the positioning indoors.

A wireless network signal received by the mobile device may vary according to an environment in which the mobile device is located. For example, the presence or absence of a signal from an access point of a wireless network or the strength of the signal may vary due to structures such as walls and buildings. When it is desired to provide a location-based service based on wireless network information, it is difficult to identify a range in which a mobile device provides a location-based service without directly visiting a PoI and directly measuring a service area.

It is also difficult to satisfy a need to provide a service within different ranges for service providers, such as advertisers, that provide location-based services.

Accordingly, there is a need in the art for a method and apparatus capable of providing a location-based service based on information on a wireless network scanned by a mobile device.

SUMMARY

Aspects of the disclosure address at least the above-mentioned problems and/or disadvantages and provide at least the advantages described below. Accordingly, an aspect of the disclosure is to provide a geofencing method and an electronic device capable of setting a serviceable radius in which a location-based service is provided as intended.

In accordance with an aspect of the disclosure, a geofencing server includes a memory configured to store a database including wireless fingerprint information for a PoI, a communication module configured to perform communication with an electronic device, and a processor connected to the memory and the communication circuit, wherein the memory stores instructions that, when executed, cause the processor to obtain wireless network information collected at a plurality of points through the communication circuit, determine a serviceable radius based on the wireless fingerprint information and the wireless network information, and transmit a threshold value determined based on the serviceable radius to the electronic device through the communication circuit.

In accordance with another aspect of the disclosure, an electronic device includes a memory, a display, a communication circuit, and a processor connected to the memory, the display and the communication circuit, wherein the memory stores instructions that, when executed, cause the processor to obtain point-of-interest information including a wireless fingerprint and a threshold value from a geofencing server, generate wireless network scan information based on a wireless communication signal received through the communication circuit, determine a distance value based on the wireless fingerprint and the wireless network scan information, and output a message though the display based on a result of a comparison of the distance value and the threshold value.

In accordance with another aspect of the disclosure, a method of setting a geofencing area in a geofencing server includes obtaining wireless network information collected at a plurality of points, determining a serviceable radius based on wireless fingerprint information for a point-of-interest and the wireless network information, determining a threshold value related to a first distance of the geofencing area based on the serviceable radius, and transmitting the threshold value to an electronic device.

In accordance with another aspect of the disclosure, a method of providing a service based on a geofencing area in an electronic device includes obtaining point-of-interest information including a wireless fingerprint and a threshold value from a geofencing server, generating wireless network scan information based on a wireless communication signal received by the electronic device, determining a distance value based on the wireless fingerprint and the wireless network scan information, and outputting a message though a display based on a result of a comparison of the distance value and the threshold value.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 illustrates examples of a wireless fingerprint and PoI information according to an embodiment;

In the description of the drawings, the same or similar reference numerals may be used for the same or similar components.

DETAILED DESCRIPTION

Figure 1:
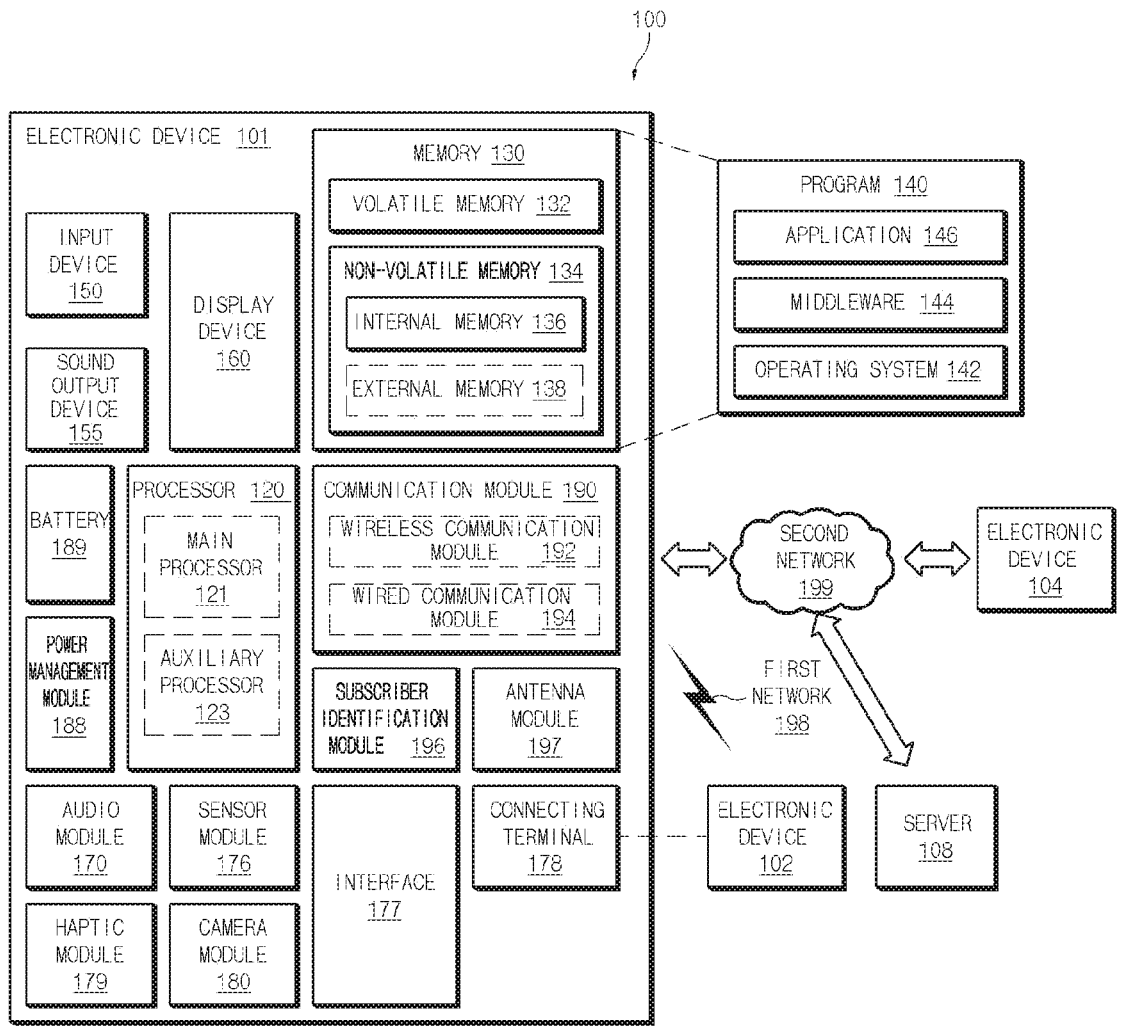
FIG. 1 illustrates an electronic device in a network environment according to an embodiment.

Embodiments will be described with reference to accompanying drawings. However, this is not intended to limit the technologies described in the disclosure to specific embodiments, and it should be understood to include various modifications, equivalents, and/or alternatives of the embodiments. Descriptions of well-known functions and/or configurations will be omitted for the sake of clarity and conciseness.

The electronic device according to embodiments may be one of various types of electronic devices, such as a portable communication device or smartphone, a computer device, a portable multimedia device, a portable medical device, a camera, a wearable device, or a home appliance. However, the electronic devices are not limited to these device types.

It should be appreciated that embodiments and the terms used therein are not intended to limit the technological features set forth herein to particular embodiments and include various changes, equivalents, or replacements for a corresponding embodiment. In the description of the drawings, similar reference numerals may be used to refer to similar or related elements.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in importance or order. It is to be understood that if an element, such as a first element, is referred to, with or without the term "operatively" or "communicatively", as "coupled with," "coupled to," "connected with," or "connected to" another element, such as a second element, this indicates that the first element may be coupled with the second element wiredly, wirelessly, or via a third element.

FIG. 1 illustrates an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

In various embodiments described below, operations of the electronic device 101 may be performed by the processor 120. For example, the processor 120 may control operations of the electronic device 101 based on instructions stored in the memory 130.

Figure 2:
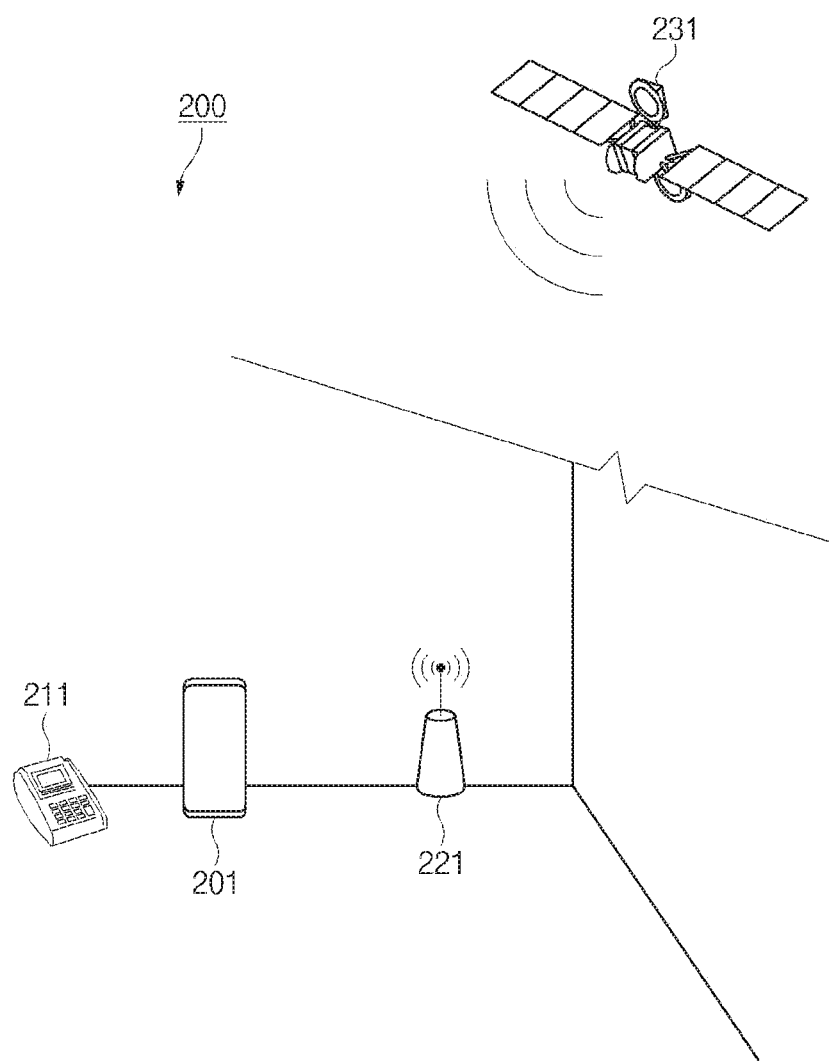
FIG. 2 illustrates a positioning environment of a mobile device according to an embodiment.

FIG. 2 illustrates a positioning environment 200 of the electronic device 101, such as a mobile device such as a smartphone, a laptop personal computer (PC), a tablet PC, a personal data assistant (PDA), or a multimedia player, or a computing device such as a desktop PC, according to an embodiment.

The electronic device 101 may perform positioning using a signal received from a satellite 231, or by using a GPS. However, as illustrated in FIG. 2, when the electronic device 101 is located indoors, GPS-based positioning may not be performed or positioning performance may be severely compromised.

In FIG. 2, PoI information associated with a wireless fingerprint may be used to measure a location of the electronic device 101.

The electronic device 101 may obtain wireless network information and/or PoI information for more accurate geofencing based on wireless network information. For example, the wireless network information may include at least one of location information obtained from a cellular network, WiFi scanning information, Bluetooth™-based positioning information, and/or ultra-wideband (UWB)-based positioning information. The PoI information may include at least one of information for identifying a PoI and a threshold value for geofencing related to the PoI. For example, the PoI information may include a wireless fingerprint including wireless network information associated with the PoI, or the electronic device 101 may further obtain information related to electronic payment performed using the electronic device 101.

The electronic device 101 may obtain location information of the electronic device 101 from at least one base station of a cellular network. In examples, the location information of the electronic device 101 may include geographic information such as latitude and longitude. The electronic device 101 may receive information about the location of the electronic device 101 from one base station. The electronic device 101 may obtain information about the location of the electronic device 101 based on signals received from a plurality of base stations. The electronic device 101 may obtain or estimate information about the location of the electronic device 101 based on the locations of the plurality of base stations and/or the strength of a reference signal received power (RSRP), or a received signal strength indicator (RSSI). The electronic device 101 may obtain geographic information from a service provider of a cellular network.

The electronic device 101 may perform positioning based on short-range communication, such as Bluetooth™ or UWB. For example, the electronic device 101 may obtain the location information of the electronic device 101 by performing positioning using at least one algorithm of time difference of arrival (TDoA), time of flight (ToF), angle of departure (AoD), angle of arrival (AoA), and/or time stamping.

The electronic device 101 may use location information obtained from a global navigation satellite system (GNSS). For example, the GNSS may include at least one of a GPS, a Galileo system, a Glonass system, or a Beidou system. Hereinafter, embodiments based on GPS will be described for convenience of description. GPS may refer to any of the above or other means for obtaining location information.

The electronic device 101 may obtain WiFi network information through communication with an external electronic device 221, such as an access point or beacon of a WiFi network. The electronic device 101 may obtain WiFi network information based on a signal received from the external electronic device 221, such as by performing WiFi scanning IN examples, the electronic device 101 may perform WiFi scanning by receiving a broadcasting signal including information related to an access point from a WiFi access point. The electronic device 101 may perform WiFi scanning by transmitting a probe request through WiFi channels individually and receiving a response from a WiFi access point. The electronic device 101 may perform WiFi scanning on all channels, but may selectively perform WiFi scanning on some channels. It should be noted that the disclosure is not limited to this example, and the electronic device 101 may receive wireless network information from an access point for performing wireless communication of other methods.

The wireless network information may include identification information, such as service set identification (SSID) and/or basic service set identification (BSSID) of the external electronic device 221, such as a media access control (MAC) address, an RSSI, and/or a channel index.

The electronic device 101 may provide a payment service to a point of sales (POS) terminal 211. For example, the electronic device 101 may transmit an electromagnetic signal including information for payment to the POS terminal 211. The electronic device 101 may transmit a signal of a magnetic secure transmission (MST) or near field communication (NFC) scheme. The electronic device 101 may receive information necessary to perform payment from a payment server. The information associated with payment may include information related to the name of a payment store, a payment amount, and/or a payment method, such as one or more card numbers.

Figure 3:
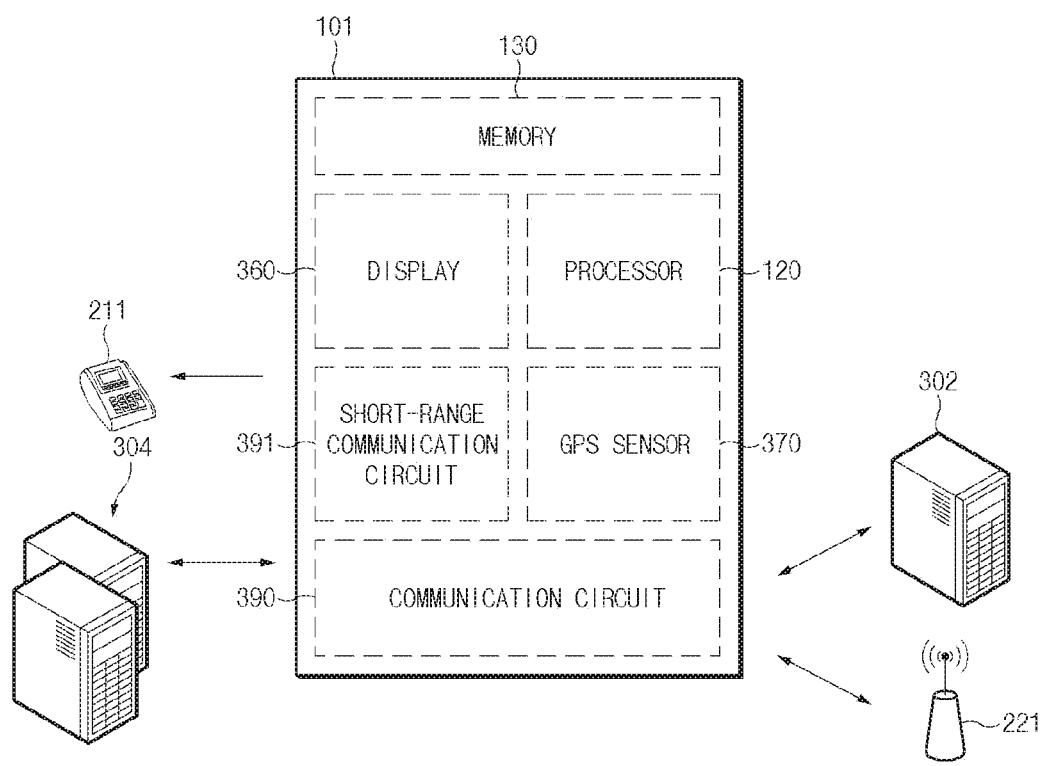
FIG. 3 illustrates a configuration of a mobile device in various positioning environments, according to an embodiment.

FIG. 3 illustrates a configuration of the electronic device 101 in various positioning environments 300, according to an embodiment.

The electronic device 101 may include at least one of the processor 120, the memory 130, a communication circuit 390, a short-range communication circuit 391, a GPS sensor 370 and a display 360.

The processor 120 may be operatively connected to the memory 130, the communication circuit 390, the short-range communication circuit 391, the GPS sensor 370, and/or the display 360 and may control the electronic device 101 and the operations of components of the electronic device 101.

The memory 130 may be operatively connected to the processor 120 and may store instructions for controlling the processor 120. The memory 130 may store instructions that cause the processor 120 to perform operations of the processor 120 or the electronic device 101, which will be described later herein.

The communication circuit 390 may provide communication with a first external electronic device, such as a geofencing server 302, a second external electronic device, such as an access point 221, and a third external electronic device, such as a payment server 304, through networks. The communication circuit 390 may communicate with the first external electronic device 302 and/or the third external electronic device 304 through any network having an Internet connection, such as a WiFi network, a local area network (LAN), a wide area network (WAN), or a cellular network. The communication circuit 390 may communicate with the second external electronic device 221 based on a WiFi protocol.

The short-range communication circuit 391 may be configured to perform a transaction with the POS terminal 211. The short-range communication circuit 391 may generate an electromagnetic signal for transmission of payment information to the POS terminal 211. The short-range communication circuit 391 may be configured to transmit payment information to the POS terminal 211 using a signal based on at least one of MST or NFC. For example, the processor 120 may transmit payment information to the POS terminal 211 by using MST and NFC simultaneously to increase a recognition rate. The processor 120 may be configured to transmit a signal for NFC-based payment when MST-based payment fails.

The GPS sensor 370 may be configured to obtain a location of the electronic device 101 based on a satellite signal, such as based on GNSS.

At least one of the communication circuit 390, the short-range communication circuit 391, and the GPS sensor 370 may be implemented with one or a plurality of circuits, such as chips. In examples, the communication circuit 390 and the short-range communication circuit 391 may be referred to as at least one communication circuit. The communication circuit 390, the short-range communication circuit 391, and the GPS sensor 370 may be referred to as at least one communication circuit. The communication circuit 390 and the GPS sensor 370 may be referred to as at least one communication circuit.

The processor 120 of the electronic device 101 may be configured to receive information associated with payment from the third external electronic device 304, generate payment information at least including a store name associated with payment, such as POS information, from the information related to the payment, obtain wireless network information for at least one wireless network using at least one communication circuit 390, and transmit wireless network information for at least one wireless network and payment information to the first external electronic device 302. For example, the information associated with payment may include payment approval information, such as a push message or a short message service (SMS) message. The payment approval information may include at least one of information associated with user identification, such as a user name and/or card number, information associated with the POS terminal 211, such as a store name, card company information, a payment amount, a payment date, a payment time, or a payment item. However, the disclosure is not limited thereto, and the processor 120 of the electronic device 101 may be configured to transmit wireless network information on at least one wireless network to the first external electronic device 302 or a third-party electronic device according to a specified rule regardless of payment information.

For example, the processor 120 of the electronic device 101 may execute instructions to cause the processor 120 to collect wireless network information and transmit the wireless network information to the first external electronic device 302 or the third-party electronic device every specified repetition period. It should be noted that the configuration of generating payment information and transmitting wireless network information to the first external electronic device 302 is for describing an embodiment, and the electronic device 101 may collect wireless network information irrespective of payment information and transmit the wireless network information to the first external electronic device 302. That is, the electronic device 101 may not include a module related to the electronic payment.

The processor 120 may be configured to obtain wireless network information for at least one wireless network when information associated with payment is received. The processor 120 may also be configured to obtain wireless network information for at least one wireless network when payment based on NFC or MST is performed. Herein, the wireless network information obtained in connection with payment information may be referred to as wireless network information at the time of payment.

The processor 120 may be configured to obtain wireless network information for at least one wireless network according to a rule specified for the operation of the communication circuit 390. For example, the processor 120 may obtain wireless network information at a predetermined period, such as 2 hours, or when the amount of change in a coordinate value measured through the GPS sensor 370 exceeds a predetermined value. Herein, the wireless network information obtained according to the specified rule may be referred to as surrounding wireless network information.

The processor 120 may transmit the obtained wireless network information to the first external electronic device 302 or the third-party electronic device through the communication circuit 390. When the wireless network information is transmitted to the third-party electronic device, the first external electronic device 302 may copy the wireless network information collected by the third-party electronic device and use the copied wireless network information.

The processor 120 may be configured to generate the payment information by excluding information capable of identifying a user of the electronic device 101 or a payment method associated with the payment from the information related to the payment. For example, the information capable of identifying the user may include at least one of the user's name, information about a payment method associated with the user, such as a credit card owned by the user, or a phone number of the user's electronic device 101. For example, the credit card may include at least one of a card number, a card company name, a card validation code (CVC), and a validity period.

The processor 120 may be configured to receive information related to the payment from the third-party electronic device 304 using at least one of a push notification, a push message, a short message service (SMS), and a multimedia message service (MMS).

The processor 120 may be configured to obtain the at least one wireless network information by performing wireless scanning using the communication circuit 390. For example, the at least one wireless network information may include at least one of a network identifier, a received signal strength, channel information, and location information received from a network.

The processor 120 may be configured to receive PoI information from the first external electronic device 302 using at least one communication circuit 390, and run at least one application based on the location associated with the PoI information by comparing the PoI information with the wireless network information. For example, the processor 120 may be configured to execute a specific application corresponding to a store associated with the PoI information. The specific application provides location-based content and may include a store membership application or an advertisement providing application.

The PoI information may include an identifier based on a store name and at least one wireless fingerprint associated with the identifier.

The at least one wireless fingerprint may include a network identifier, average received signal strength information, and/or dispersion information of a received signal strength.

A data transmission method of the electronic device 101 may include receiving information associated with payment from the third external electronic device 304, generating payment information at least including a store name associated with the payment based on the information related to the payment, obtaining wireless network information for at least one wireless network associated with the electronic device, and transmitting the obtained wireless network information for at least one wireless network and the payment information to the first external electronic device 302.

The electronic device 101 may obtain the wireless network information for at least one wireless network in response to reception of the information related to the payment.

The data transmission method may further include performing the payment using NFC or MST, and the wireless network information for at least one wireless network may be obtained in response to the payment using the NFC or MST.

Generating the payment information may include excluding information capable of identifying a user of the electronic device 101 or a payment method associated with the payment from the information related to the payment.

The information related to the payment may be received from the third-party electronic device 304 using at least one of a push notification, a push message, an SMS, or an MMS.

The wireless network information on at least one wireless network may include at least one of a network identifier, a received signal strength, channel information, and location information received from a network.

The wireless network information on the at least one wireless network may be obtained by performing wireless scanning.

The data transmission method may further include receiving PoI information from the first external electronic device 302, and executing at least one application based on the location associated with the PoI information by comparing the PoI information with the wireless network information.

The memory 130 may store instructions that cause the processor 120 to perform a transaction with a POS device 211 using the short-range communication circuit 391, receive a message related to the transaction from an external server, such as the third external electronic device 304, determine whether the transaction is an offline transaction or an online transaction, when the transaction is an offline transaction, extract POS information from the message, determine at least a location by using at least one of at least one wireless communication circuit 390 and the GPS sensor 370, and transmit the POS information and the location to an external server, such as the first external electronic device 302. For example, the message related to the transaction may include the information related to the payment described above, such as at least one of a push message or an SMS message.

The memory 130 may further include at least one instruction, which when executed, causes the processor 120 to determine the transaction as the offline transaction when the transaction is performed based on NFC or MST.

The memory 130 may further include at least one instruction that, when executed, causes the processor 120 to determine the location by performing scanning on at least one wireless network using the at least one wireless communication circuit 390.

The memory 130 may further include at least one instruction that, when executed, causes the processor 120 to transmit at least one of a network identifier associated with the scanned wireless network, a received signal strength, or channel information to the first external electronic device 302.

The POS information may include store name information related to the transaction.

Figure 4:
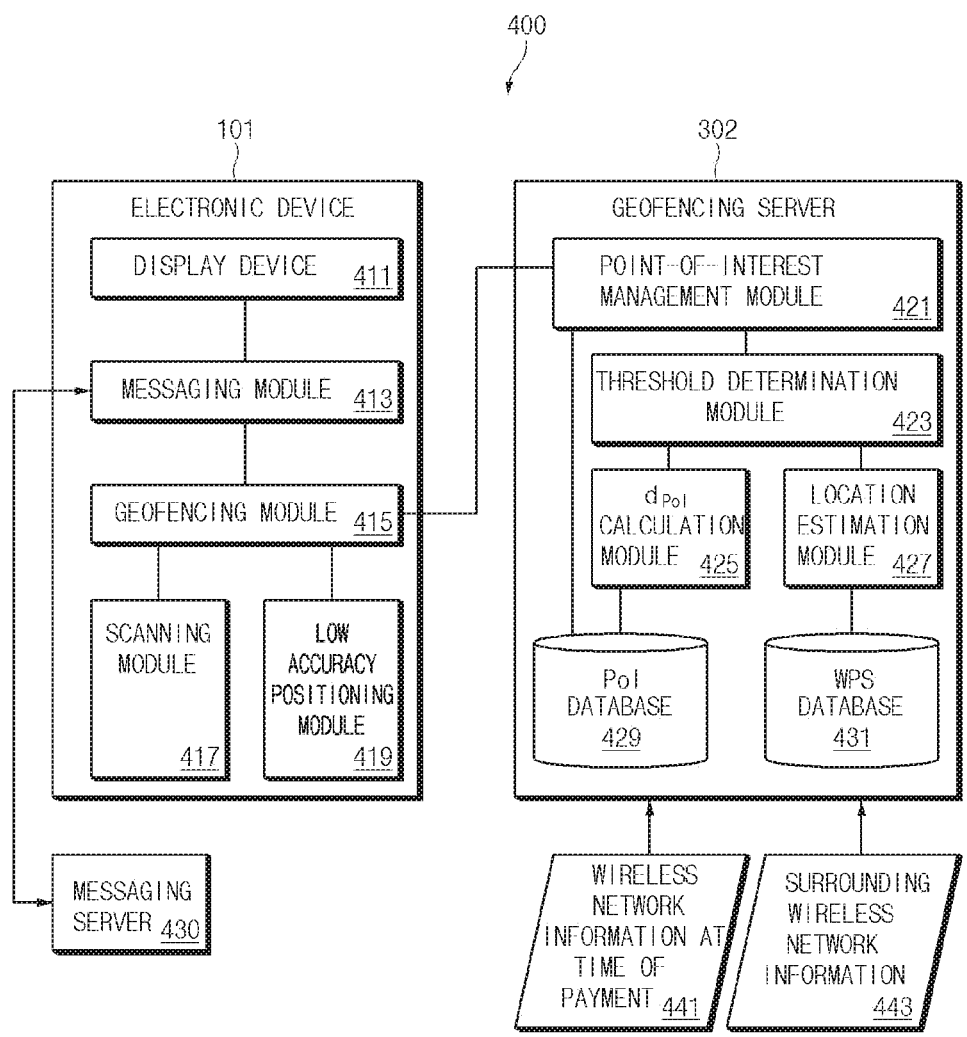
FIG. 4 illustrates configurations of a mobile device and a geofencing server according to an embodiment.

FIG. 4 is a block diagram 400 illustrating configurations of the electronic device 101 and the geofencing server 302 according to an embodiment.

The components of the electronic device 101 and the geofencing server 302 shown in FIG. 4 are examples and may be implemented with hardware and/or software modules. The electronic device 101 and/or the geofencing server 302 may further include components not shown in FIG. 4 or may not include at least some of the components shown in FIG. 4. Operations by components of the electronic device 101 and the geofencing server 302 to be described below may be performed by the processor 120.

The geofencing server 302 may include at least one of a PoI management module 421, a threshold determination module 423, a distance ($d_{PoI}$) calculation module 425, a location estimation module 427, a PoI database 429 and a wireless network positioning system (WPS) database 431.

The geofencing server 302 may include the PoI database 429 including a wireless fingerprint generated based on wireless network information and location information obtained in such a manner that various electronic devices perform Wi-Fi scanning at the time of payment. For example, the geofencing server 302 may obtain information, such as a store name, on a place, such as a store, related to payment from payment information and generate a wireless fingerprint for a PoI using wireless scanning information.

The geofencing server 302 may collect wireless network information from various electronic devices. The wireless network information received by the geofencing server 302 may include at least one of wireless network information at the time of payment 441 and surrounding wireless network information 443.

The distance calculation module 425 may calculate a distance value based on the collected wireless network information and the wireless fingerprint stored in the PoI database 429. The distance calculation module 425 may operate to calculate a distance value having a smaller value as a wireless network having a larger report count value included in the wireless fingerprint is included in the wireless network information. The report count value is obtained by counting the number of times information on the network is included in the wireless network information upon which generation of the wireless fingerprint is based. The distance calculation module 425 may calculate a distance value having a smaller value as an RSSI of the wireless network included in the wireless fingerprint is similar to the received signal strength value of the wireless network included in the wireless network information. For example, the distance calculation module 425 may calculate a distance value between 0 and 1 for each wireless network information based on Equation (1) below.

$$d_{PoI} = \frac{\sum_{i=1}^{K} * \left(\frac{r_i}{s_i}\right)^2 * \left(1 - \min\left(1, \frac{\text{abs}(t_i - s_i)}{\max(35, 90 + s_i)}\right)\right)}{\sum_{j=1}^{L} \left(\frac{r_j}{s_j}\right)^2} \quad (1)$$

In Equation (1), "r" indicates a report count value of the wireless network included in the fingerprint information, "t" indicates a received signal strength value for a wireless network included in the wireless network information, and "s" indicates a received signal strength value for a wireless network included in the wireless fingerprint.

The location estimation module 427 may estimate from which location the collected wireless network information is collected. The location estimation module 427 may estimate a location where wireless network information is collected using location information included in the wireless network positioning system database 431. The wireless network positioning system database 431 may include the latitude and longitude information of access points of a wireless network for a wireless network positioning system, such as a WiFi positioning system (WPS). For example, when a WiFi list included in the wireless network information includes "A", "B", and "C", the coordinates of "A" are (5, 5), the coordinates of "B" are (10, 15), and the coordinates of "C" are (15, 16), which are stored in the WPS database 431, the location estimation module 427 may determine that the latitude and longitude of the location where the wireless network information is collected are the average values (10, 12).

The geofencing server 302 may select only a part of the surrounding wireless network information 443 as a target for distance value calculation and location estimation, to prevent unnecessary computation. The geofencing server 302 may select, as a target for distance value calculation and location estimation, only the surrounding wireless network information 443 including at least some of wireless networks having a high report count value among wireless networks included in the wireless fingerprint of the PoI database 429. The information on wireless networks having a high report count value among wireless networks may be referred to as main wireless network information.

The threshold determination module 423 may determine a threshold value ($d_{TH}$) based on the calculated distance value and the estimated location for the wireless network information. The threshold determination module 423 may determine whether a point where wireless network information is collected is a serviceable point for providing a location-based service, based on a candidate threshold value. Accordingly, the threshold determination module 423 may select at least one serviceable point from a plurality of points where wireless network information is collected. For example, when a candidate threshold value is 0.75 and a distance value calculated for wireless network information collected at an point is 0.7, the threshold determination module 423 may determine that the point is a serviceable point.

The threshold determination module 423 may obtain location information of points selected as a serviceable point based on the location estimated by the location estimation module 427. The threshold determination module 423 may determine a serviceable radius based on the distribution of the serviceable points, such as the average and variance values of location coordinates representing the locations of the serviceable points. The serviceable radius may indicate a distance at which service provision is started as a PoI is approached.

The threshold determination module 423 may determine whether the determined serviceable radius satisfies a specified service provision range, which is an area centering on a PoI in which a service provider who wishes to provide a service wants to provide a service. When a serviceable radius does not satisfy a specified service provision range, the threshold determination module 423 may adjust a candidate threshold value. For example, the threshold determination module 423 may increase the candidate threshold value when the serviceable radius is smaller than the specified service provision range. The threshold determination module 423 may re-determine the serviceable radius based on the adjusted candidate threshold value. When the serviceable radius satisfies the specified service provision range, the threshold determination module 423 may determine a final candidate threshold value which has been adjusted as a threshold value.

The PoI management module 421 may store PoI information in which the determined threshold value is combined with the wireless fingerprint, in the PoI database 429. The PoI information may include a wireless fingerprint and a threshold value for a PoI, and other information such as a store name related to the PoI. Examples of the wireless fingerprint and the PoI information are provided below in FIG. 6.

The PoI management module 421 may transmit the PoI information included in the PoI database 429 to the electronic device 101 in response to a request for the PoI information received from a geofencing module 415 of the electronic device 101.

The PoI information transmitted to the electronic device 101 may include a threshold value determined for the PoI. The PoI management module 421 may quantize a threshold value and store the quantized threshold value in the PoI database 429. For example, the quantized threshold value may include either a representative value or an index value. Alternatively, the threshold value may include either the threshold value itself or range information on a range of a distance value of a terminal in which service provision is performed according to the threshold value. For example, when the threshold value is 0.7, the range information may represent a range of greater than or equal to 0 and less than 0.7. The representative value may represent a predetermined value determined according to a range to which the determined threshold value belongs. For example, when the threshold value is greater than or equal to 0.7 and less than 0.8, the representative value may be 7.5, when the threshold value is greater than or equal to 0.8 and less than 0.9, the representative value may be 8.5, and when the threshold value is greater than or equal to 0.9 and less than 1, the representative value may be 9.5.

The index value may indicate a predetermined index value for a range to which the threshold value belongs. For example, when the threshold value is greater than or equal to 0.7 and less than 0.8, the index value may be 1, when the threshold value is greater than or equal to 0.8 and less than 0.9, the index value may be 2, and when the threshold value is greater than or equal to 0.9 and less than 1, the index value may be 3.

The electronic device 101 may include at least one of a display device 411, a messaging module 413, the geofencing module 415, a scanning module 417, and a low accuracy positioning module 419.

The low accuracy positioning module 419 may measure a position of the electronic device 101 according to a process that has low accuracy, such as the error range of 500 meters (m) or 1 kilometer (km) and/or consumes low power (e.g. less power than average). The geofencing module 415 may transmit a scanning request for requesting the scanning module 417 to scan wireless networks when a location measured by the low accuracy positioning module 419 is within a specified distance, such as 2 km from a location included in the PoI information. In response to the scanning request, the scanning module 417 may return wireless network scan information on the scanned wireless network to the geofencing module 415.

The geofencing module 415 may calculate a distance value ($d_{PoI}$) representing a distance from a PoI based on the wireless network scan information on the scanned wireless network and the PoI information received from the geofencing server 302. For example, the geofencing module 415 may calculate a distance value by inputting the wireless network scan information and values included in the wireless fingerprint included in the PoI information into Equation (1).

The geofencing module 415 may compare the calculated distance value with a threshold value included in the PoI information, and may cause a location-based service to be performed when the calculated distance value satisfies a condition determined by the threshold value. For example, when the threshold value is 0.75 and the calculated distance value is 0.71, the geofencing module 415 may determine that the electronic device 101 has entered the serviceable radius and request a module that performs location-based service to perform a location-based service. A concept for a method for determining whether the electronic device 101 has entered a serviceable radius according to embodiments will be been described in more detail with reference to FIG. 7.

In FIG. 4, the messaging module 413 is an example of a module that performs a location-based service. In response to a request to perform a location-based service, the messaging module 413 may request a message, such as a push message, an instant message, an SMS message or an MMS message, from the messaging server 430. The messaging module 413 may output a message received from the messaging server 430 through the display device 411. It should be noted that the display device 411 is an example of an output device for outputting a message, and another type of device may be further used or the device for outputting the message may be replaced with another type of device.

Figure 5:
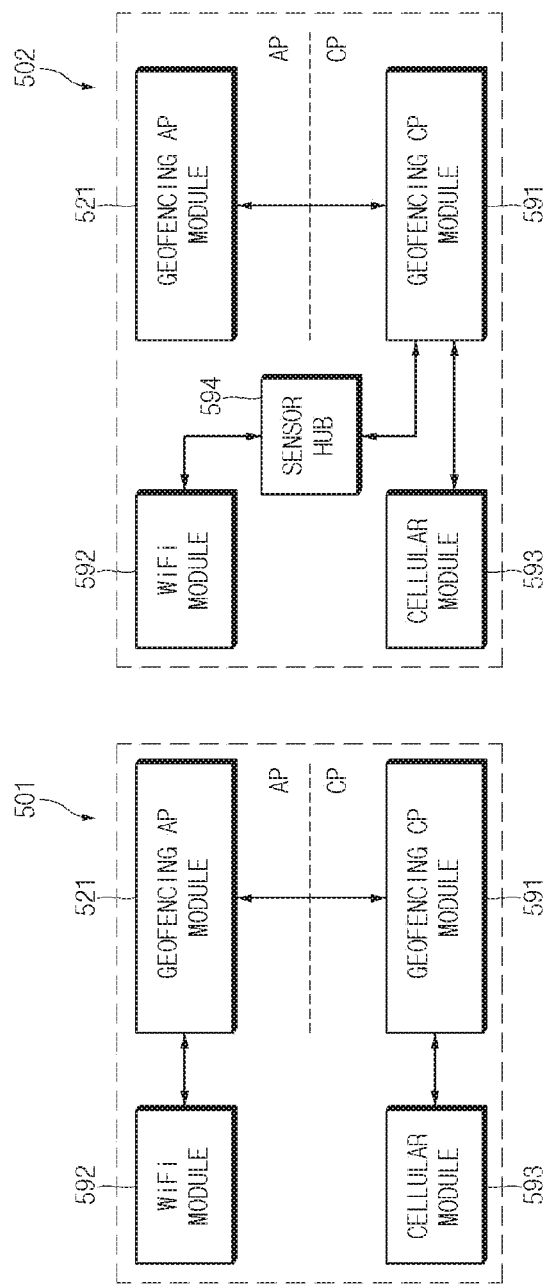
FIG. 5 illustrates a block diagram of a geofencing module according to an embodiment.

FIG. 5 illustrates structures 501 and 502 of a geofencing module according to an embodiment.

The electronic device may include the communication circuit 390 that performs functions related to wireless and/or wired communication. For example, the communication circuit 390 may include at least one CP. The CP may perform functions related to cellular communication, and the WiFi communication presented as an example of short-range communication may be performed by a separate WiFi module. The electronic device 101 may include the processor 120 or an AP that performs various functions such as an operating system and applications.

According to the first structure 501 of the geofencing module of FIG. 5, an AP may control a WiFi module 592 and a CP may control a cellular module 593. For example, the AP may have higher power consumption than the CP.

The electronic device may perform coarse-grained geofencing by performing low accuracy positioning using a geofencing CP module 591 configured in the CP, and only when precise geofencing is required, perform geofencing by using a geofencing AP module 521 configured in the AP. In examples, the geofencing CP module 591 may perform geofencing, such as determining proximity to a position of interest, based on cellular network information from the cellular module 593. In another examples, the geofencing AP module 521 may perform geofencing based on WiFi network information (and/or cellular network information received from the cellular module 593) received from the Wi-Fi module 592. For example, The electronic device may reduce power consumption by performing geofencing based on the AP and/or the CP according to required precision.

According to the second structure 502 of the geofencing module of FIG. 5, the CP of the electronic device may obtain information of the Wi-Fi module 592 through a sensor hub 594. By providing information on the Wi-Fi module 592 to the CP, the CP may perform geofencing based on WiFi network information and/or cellular network information. For example, the geofencing CP module 591 may call the geofencing AP module 521 only when an event occurs, such as when the electronic device is located adjacent to a specified PoI. In this case, most of operations of the geofencing module 415 of FIG. 4 other than the execution of the application may be performed by the geofencing CP module 591, thus reducing power consumption.

FIG. 6 illustrates examples of a wireless fingerprint 610 and PoI information 620 according to an embodiment.

In FIG. 6, the wireless fingerprint 610 may include location coordinates and wireless network information collected at the location coordinates. The wireless network information included in the wireless fingerprint 610 may include at least one of a MAC address of an access point which identifies a wireless network, an average value of received signal strengths for wireless networks, and a report count value for each wireless network. It should be noted that the wireless fingerprint 610 illustrated in FIG. 6 is an example and may not include some of pieces of information illustrated in FIG. 6 or may further include additional information.

The geofencing server 302 may store statistical information based on wireless fingerprints collected from various external electronic devices. For example, the statistical information may include at least one of the number of times the wireless network has been scanned and an average value of received signal strengths of the scanned wireless networks. The PoI information 620 may include a store name (e.g., "Bob's coffee shop", a wireless fingerprint, and a threshold value $d_{TH}$ which are associated with a PoI. It should be noted that the PoI information 620 illustrated in FIG. 6 is an example and may not include some of pieces of information illustrated in FIG. 6 or may further include additional information.

Figure 7:
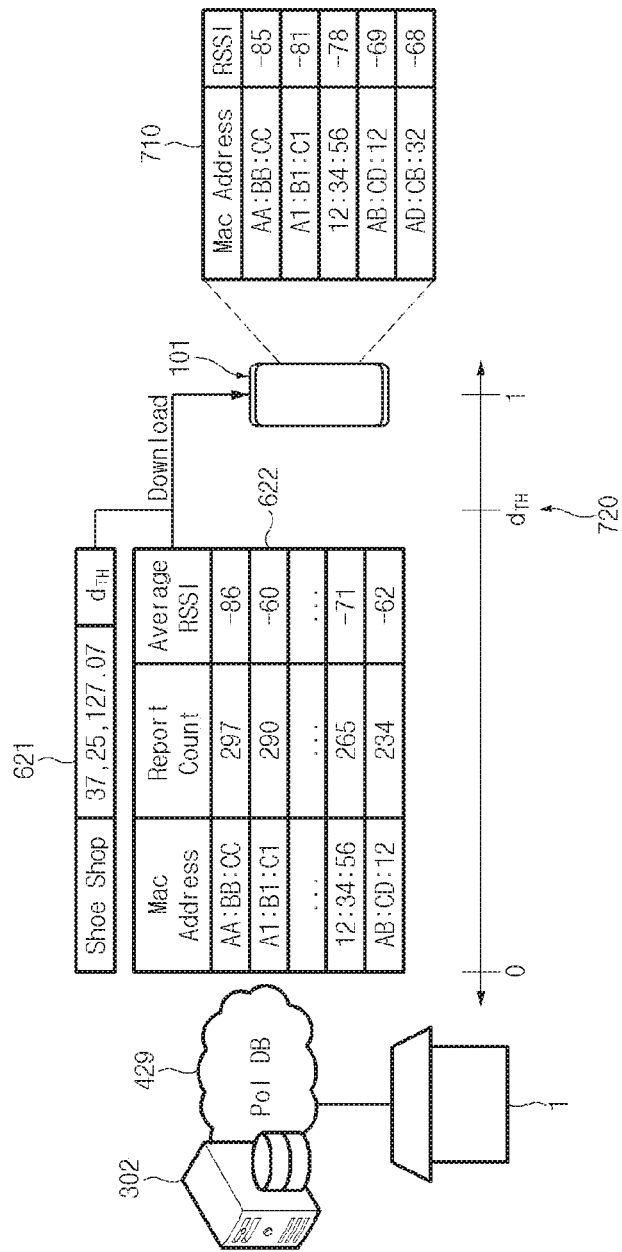
FIG. 7 illustrates a location-based service method according to an embodiment.

FIG. 7 illustrates a location-based service method according to an embodiment.

In FIG. 7, the geofencing server 302 may include the PoI database 429 storing PoI information 621 including a store name and location information of a store 1 that is a PoI, a threshold value and a wireless fingerprint 622.

In FIG. 7, an electronic device may receive the PoI information 621 including the wireless fingerprint 622 and a threshold value 720 from the geofencing server 302. The mobile terminal 101 may obtain wireless network scan information 710 by scanning wireless networks around the mobile terminal.

An electronic device 101 may calculate a distance value based on a result of comparison of the wireless fingerprint 622 received from the geofencing server 302 and the wireless network scan information 710. The mobile terminal 101 may perform a location-based service when the calculated distance value is less than or equal to a threshold value.

Figure 8:
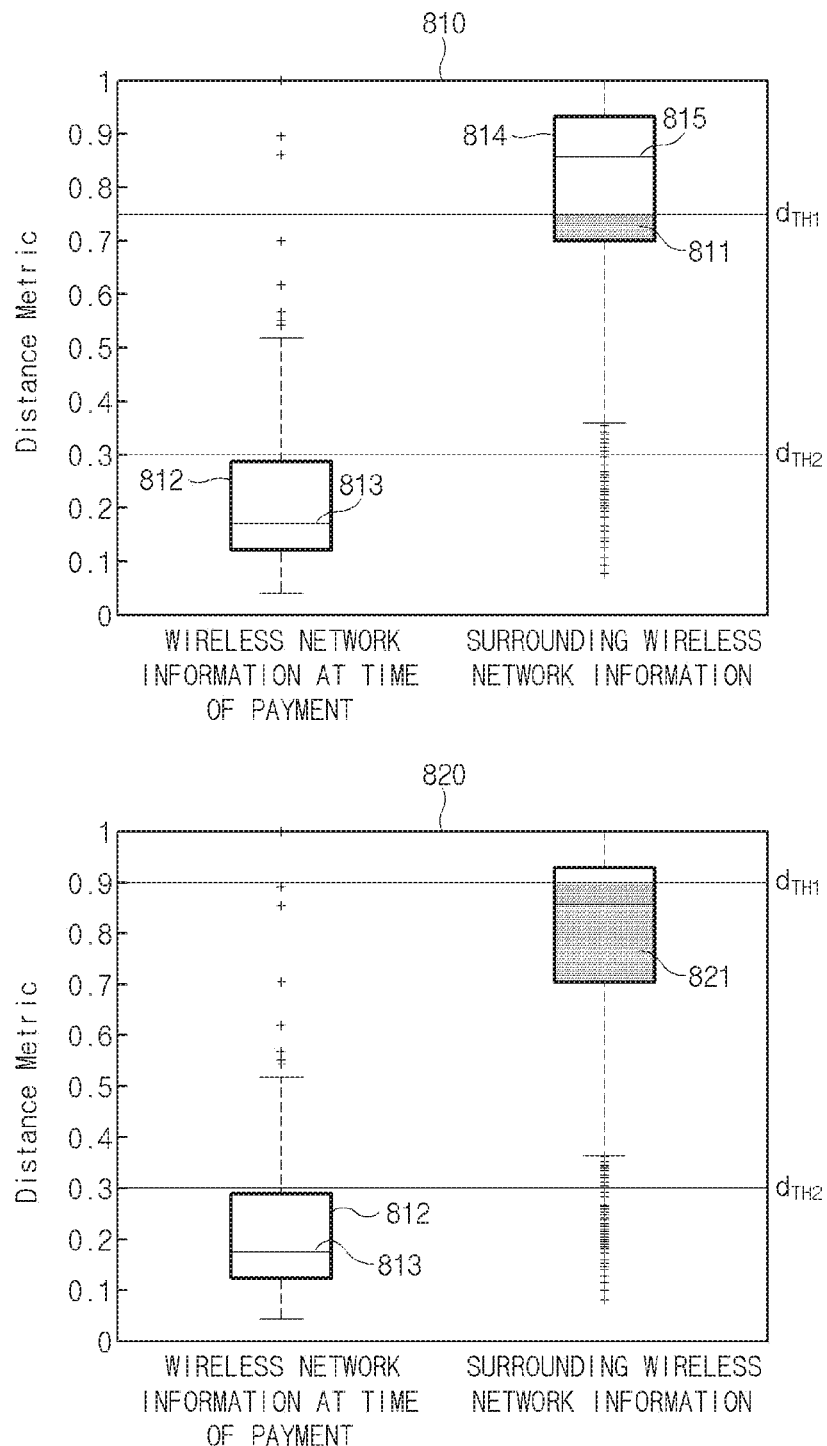
FIG. 8 illustrates a method of selecting a threshold value according to an embodiment.

FIG. 8 illustrates graphs 810 and 820 by visualizing, with a boxplot, distance values of wireless network information at the time of payment and surrounding wireless network information, collected by the geofencing server 302 for a specified PoI to describe a method of selecting a threshold value according to an embodiment. The vertical axes of the graphs 810 and 820 of FIG. 8 represent distance values. In particular, the first graph 810 illustrates when a candidate threshold value $d_{TH1}$ is 0.75, and the second graph 820 illustrates when the candidate threshold value $d_{TH1}$ is 0.9.

The wireless network information at the time of payment collected during offline payment at the PoI may be considered as being collected at the PoI. Accordingly, the wireless network information at the time of payment may be determined as data collected when a mobile terminal is located at the PoI, such as when a person holding the mobile terminal is located in a store.

The electronic device 101 may consider each wireless network information as information about wireless networks collected at a location estimated by the location estimation module 427. Accordingly, the electronic device may calculate a distance value based on the similarity between a wireless fingerprint and wireless network information at the PoI. Graphs 810 and 820 illustrate an arrangement in ascending order of the calculated distance values. When the distance values are sorted in ascending order, the lower lines of the boxes 812 and 814 included in the graphs 810 and 820 may represent a point at which the distance value is at the lower $25^{th}$ percentile (25%), and the upper lines may represent a point at which the distance value is at the upper $25^{th}$ percentile (25%). The horizontal lines 813 and 815 inside the boxes 812 and 814 may represent intermediate values of the distance values, respectively.

Referring to FIG. 8, the intermediate values of the distance values corresponding to wireless network information at the time of payment may be about 0.17, the lower 25% value may be about 0.12, and the lower 75% value may be about 0.39. That is, it can be seen that the pieces of network information collected at the time of payment at the PoI indicate that distance values belonging to 50% between the lower 25% and the lower 75% values are distributed between 0.17 and 0.29.

When comparing the first graph 810 and the second graph 820, it can be seen that a region 821 to which values corresponding to a service provision point belong when the threshold value is 0.9 is widened compared to the region 811 to which values corresponding to the service provision point belong when the threshold value is 0.75.

Figure 9:
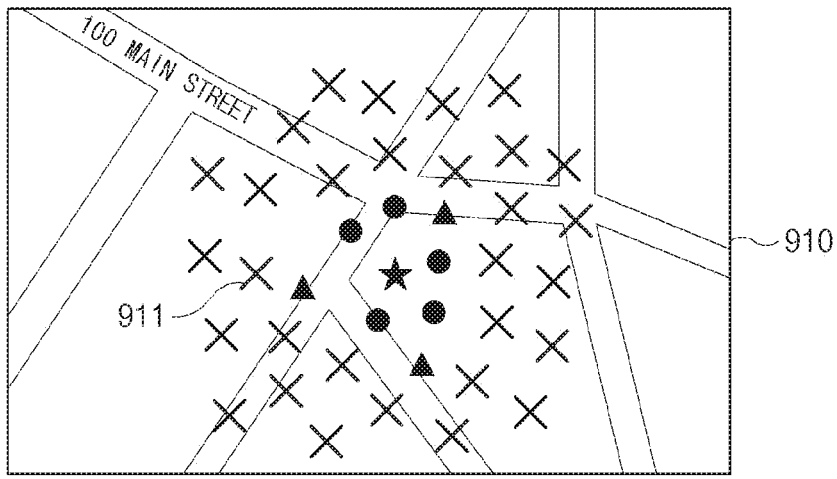
FIG. 9 illustrates a relationship between a threshold value and a serviceable radius according to an embodiment.
Figure 9:
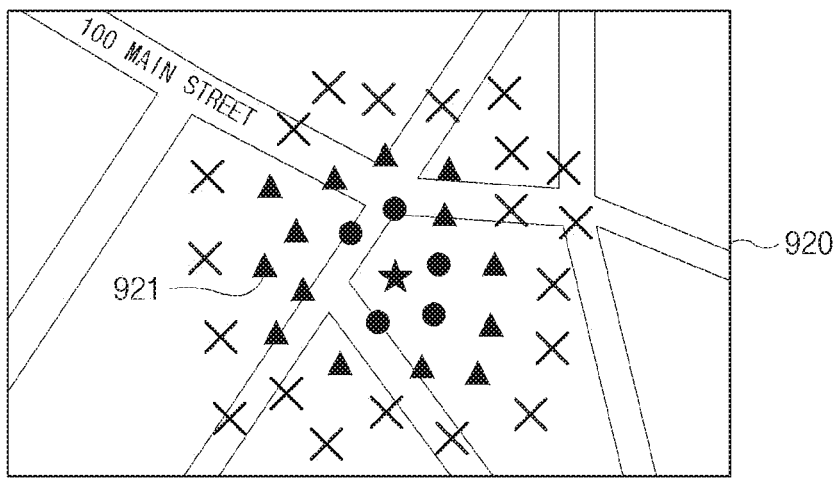

FIG. 9 illustrates a relationship between a threshold value and a serviceable radius according to an embodiment. In particular, FIG. 9 shows a result 910 of determining random points based on a low threshold value and a result 920 of determining random points based on a relatively high threshold value.

In FIG. 9, a location of a PoI may be location information of a PoI included in a wireless fingerprint.

An "In" determination information-estimated location may be estimated by the geofencing server 302 based on wireless network information indicating that an electronic device is determined to be located at the PoI, such as a distance value for a wireless fingerprint determined based on the wireless network information being less than or equal to the threshold value $d_{TH2}$, such as 0.3 in FIG. 8.

A "Near" determination information-estimated location may be estimated by the geofencing server 302 based on wireless network information indicating that an electronic device is determined to be located around the PoI, such as a serviceable point indicating that a distance value for a wireless fingerprint determined based on the wireless network information is greater than the threshold value $d_{TH}$, such as 0.3 In FIG. 8 or less than or equal to the threshold value $d_{TH2}$, such as 0.75 in FIG. 8.

A "Far" determination information-estimated location may be location information estimated by the geofencing server 302 for wireless network information not determined to be "In" or "Near".

When the threshold value $d_{TH1}$ is adjusted to a higher value, the location 911 for the wireless network information that has been determined to be "Far" may be changed to the location 921 for the wireless network information that has been determined to be "Near". Therefore, the location for the wireless network information that has been determined to be "Near" is distributed over a wider range, thus leading to an increase in the serviceable radius.

Figure 10:
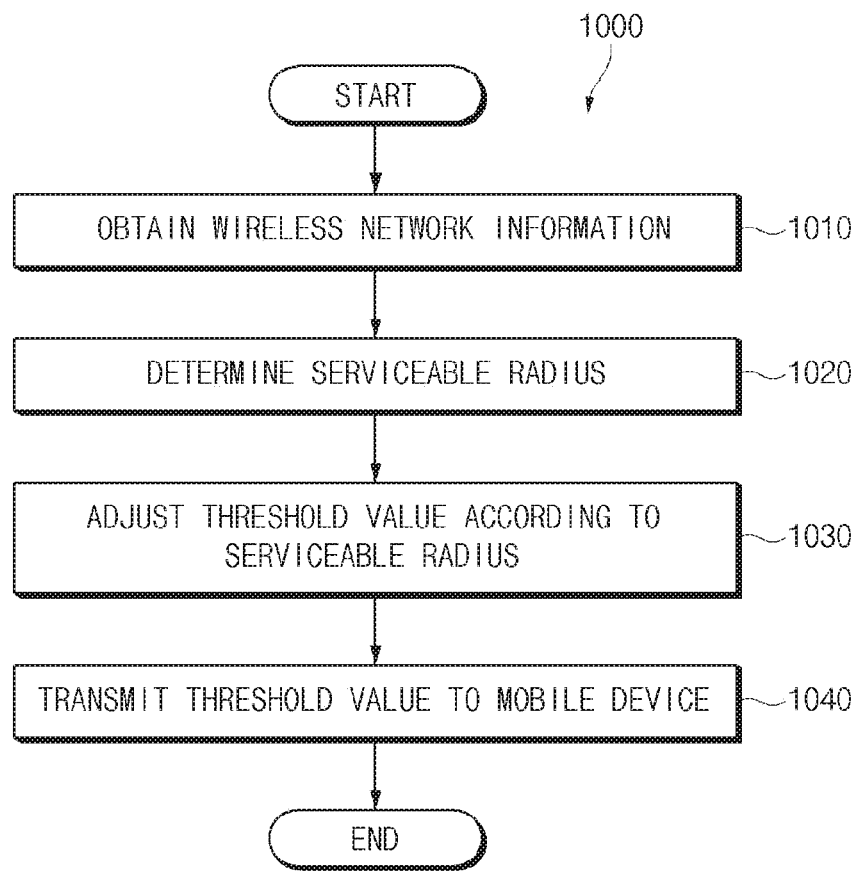
FIG. 10 illustrates a process by which a geofencing server provides a threshold value to a mobile device according to an embodiment.

FIG. 10 is a flowchart 1000 of a process by which a geofencing server provides a threshold value to an electronic device according to an embodiment.

In step 1010, the geofencing server 302 may obtain wireless network information for a plurality of points from one or more mobile terminals. In step 1020, the geofencing server may determine a serviceable radius based on the received wireless network information and a candidate threshold value.

The geofencing server may determine whether the determined serviceable radius satisfies a service provision range. When the serviceable radius does not satisfy the service provision range, in step 1030, the geofencing server may adjust the candidate threshold value according to the serviceable radius. The geofencing server may return to step 1020 based on the adjusted candidate threshold value. The geofencing server may repeatedly perform steps 1020 and 1030 to identify the serviceable radius while increasing or decreasing the candidate threshold value until the candidate threshold value forming the serviceable radius that satisfies the service provision range is determined.

Figure 12:
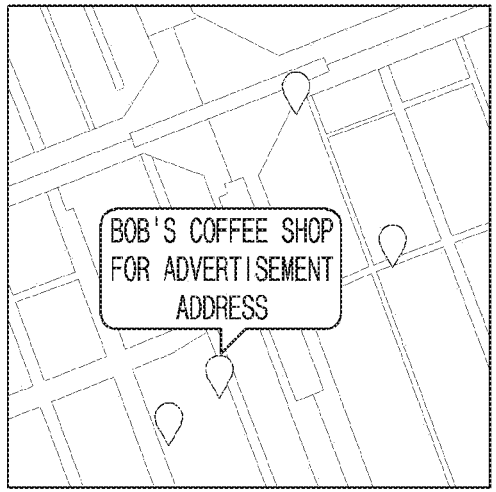
FIG. 12 illustrates an example of a portal web page for receiving a service provision range according to an embodiment.

The service provision range may be a value set in connection with the provision of a location-based service. For example, the geofencing server may receive a service provision range through a portal web page provided through a geofencing server or a separate portal server. An example of the portal web page is shown in FIG. 12.

When a candidate threshold value forming a serviceable radius satisfying a service provision range is determined, the geofencing server may determine the candidate threshold value as a threshold value for the PoI. The geofencing server may store the determined threshold value, and in step 1040, may transmit the stored threshold value to the electronic device at a request of the electronic device.

Figure 11:
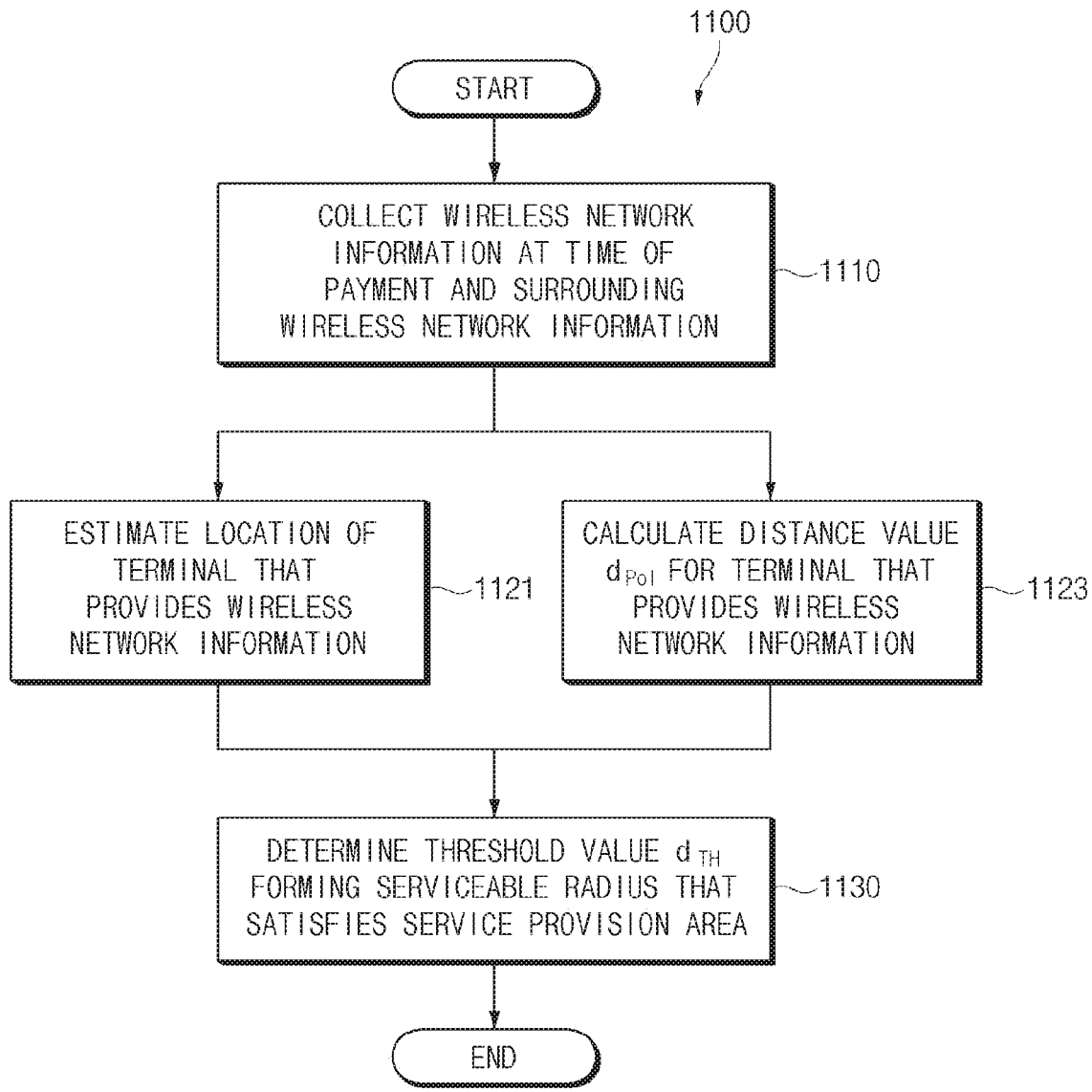
FIG. 11 illustrates a process by which a geofencing server determines a threshold value according to an embodiment.

FIG. 11 is a flowchart 1100 of a process by which the geofencing server 302 determines a threshold value according to an embodiment.

In step 1110, the geofencing server may collect wireless network information at the time of payment and surrounding wireless network information.

In step 1121, the geofencing server may estimate a location of at least one terminal that provides information about each of the collected wireless network information at the time of payment and surrounding wireless network information. The geofencing server may use information stored in a WPS database to estimate the location of the at least one terminal.

In step 1123, while estimating the location in step 1121, the geofencing server may calculate at least one distance value representing a distance from a PoI to a location of the at least one terminal that provides the information. The geofencing server may use a wireless fingerprint and wireless network information for a PoI to calculate the at least one distance value.

In step 1130, the geofencing server may determine a threshold value based on at least one location estimated in step 1121 and at least one distance value calculated in step 1123. The determined threshold value may be such that a serviceable radius determined by being applied to at least one position estimated in step 1121 and at least one distance value calculated in step 1123 satisfies a service provision range.

FIG. 12 illustrates an example of a portal web page 1200 for receiving a service provision range according to an embodiment.

In FIG. 12, the portal web page 1200 for receiving information on a desired service from a service provider who wants to register a location-based service may be provided to the service provider's device by a separate portal server or a geofencing server. The portal web page 1200 may be displayed on a display device of the service provider's device.

The geofencing server may obtain information on a service provision range corresponding to an input 1210 for selecting an item for selecting a service provision range, which is included in the portal web page 1200. For example, when the service provider's device receives an input for selecting an item for selecting a service provision range through an input device of the device, the service provider's device may transmit information on the service provision range to the geofencing server. The geofencing server may determine a threshold value based on the information on the service provision range. For example, when the serviceable radius formed based on a threshold value set as a default value is smaller than a radius of the service provision range, the geofencing server may increase the threshold value. The geofencing server may transmit PoI information including the determined threshold value to an electronic device.

Figure 13:
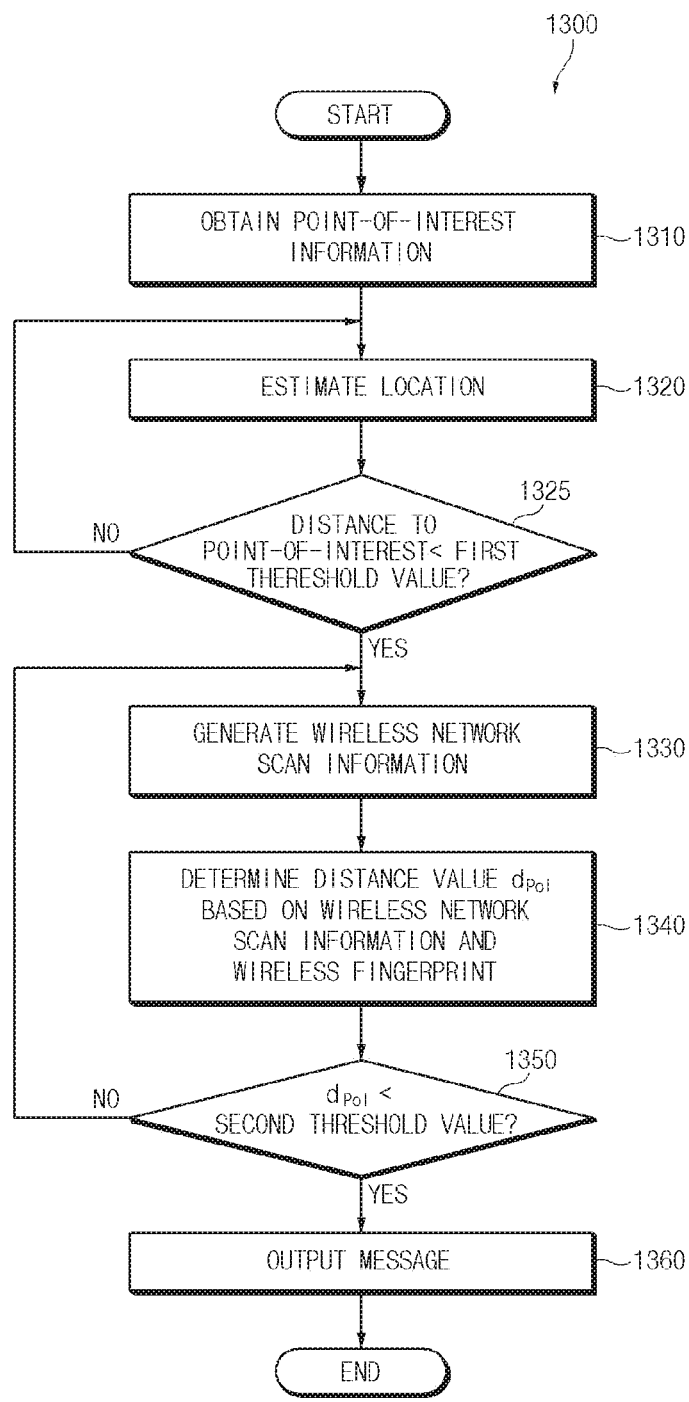
FIG. 13 illustrates a process of performing a location-based service that outputs a message in a mobile device according to an embodiment.

FIG. 13 is a flowchart 1300 of a process by which an electronic device performs a location-based service of outputting a message according to an embodiment.

In step 1310, the electronic device may obtain PoI information from a geofencing server. The PoI information may include a second threshold value for determining whether the electronic device is located within a service radius from the PoI.

In step 1320, the electronic device may measure a location of the electronic device. In step 1320, the electronic device may measure a location of the electronic device based on an operation capable of being performed with low power. The operation capable of being performed with low power means that the electronic device performs the operation thereof by consuming less power than average. For example, the electronic device may measure a location of the electronic device using a cellular module in step 1320. In step 1325, the electronic device may compare a distance from a location of the electronic device measured with low power to a PoI with a first threshold value set in the electronic device in advance. Alternatively, the first threshold value may be included in the PoI information received in step 1310.

In step 1325, when the distance from the location of the electronic device measured with low power to the PoI is less than the first threshold value, the electronic device may proceed to step 1330 and generate wireless network scan information by scanning wireless networks around the electronic device. When the distance from the location of the electronic device measured with low power to the PoI determined in step 1325 is greater than or equal to the first threshold value, the electronic device may repeat step 1320.

In step 1340, the electronic device may determine a distance value based on the wireless network scan information and a wireless fingerprint for the PoI. As a wireless network having a larger report count value for the wireless network of the wireless fingerprint is included in the wireless network information, the electronic device may determine a smaller distance value. As a RSSI (received signal strength value) of the wireless network included in the wireless fingerprint becomes similar to a RSSI value of the wireless network included in the wireless network information, the electronic device may determine a smaller distance value. A smaller distance value may mean that the electronic device is located closer to the PoI.

In step 1350, the electronic device may compare the determined distance value received in step 1310 with a second threshold value. When the determined distance value is less than the second threshold value, the electronic device may output a message related to the PoI in step 1360. When the determined distance value is greater than or equal to the second threshold value, step 1330 is repeated.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions, and may be implemented in a form of an application-specific integrated circuit (ASIC).

Embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction. The one or more instructions may include a code generated by a compiler or a code executable by an interpreter. The machine-readable storage medium may be provided in the form of a non-transitory storage medium. Wherein, the term "non-transitory" indicates that the storage medium is a tangible device, and does not include a signal, but this term does not differentiate between where data is semi-permanently or temporarily stored in the storage medium.

According to an embodiment, a method may be included and provided in a computer program product. The computer program product may be traded as a product between a seller and a buyer. The computer program product may be distributed in the form of a machine-readable storage medium, such as compact disc read only memory (CD-ROM)), or be downloaded or uploaded online via an application store, such as PlayStore™ or between two user devices directly. If distributed online, at least part of the computer program product may be temporarily generated or at least temporarily stored in the machine-readable storage medium, such as memory of the manufacturer's server, a server of the application store, or a relay server.

In embodiments, each module or program of the above-described components may include a single entity or multiple entities. One or more of the above-described components may be omitted, or one or more other components may be added. Alternatively or additionally, a plurality of modules or programs may be integrated into a single component. In such a case, the integrated component may still perform one or more functions of each of the plurality of components in the same or similar manner as they are performed by a corresponding one of the plurality of components before the integration. Operations performed by the module, the program, or another component may be performed sequentially, in parallel, repeatedly, or heuristically, or one or more of the operations may be executed in a different order or omitted, or one or more other operations may be added.

According to embodiments herein, provided are a geofencing method and an electronic device capable of determining a threshold value for forming an appropriate service radius based on wireless network information, and a location-based service based on the threshold value to set a serviceable radius in which a location-based service is provided as intended.

Accordingly, a geofencing method and an electronic device capable of forming various serviceable radii for location-based services according to a service provider's needs are provided.

In addition, various effects may be provided that are directly or indirectly understood through the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A geofencing server comprising:
a memory configured to store a database including wireless fingerprint information for a point-of-interest;
a communication module configured to perform communication with an electronic device; and
a processor connected to the memory and the communication circuit,
wherein the memory stores instructions that, when executed, cause the processor to:
obtain wireless network information collected at a plurality of points through the communication circuit,
determine a serviceable radius based on the wireless fingerprint information and the wireless network information, and
transmit a threshold value determined based on the serviceable radius to the electronic device through the communication circuit;
wherein the wireless fingerprint includes a network identifier, average received signal strength information, and/or dispersion information of a received signal strength.

2. The geofencing server of claim 1, wherein the memory stores instructions that, when executed, further cause the processor to:
calculate a distance value representing a distance from the point-of-interest to the plurality of points based on the wireless fingerprint information and the wireless network information,
estimate location information for the plurality of points,
select at least one serviceable point among the plurality of points based on a result of a comparison of the distance value with a preset candidate threshold value, and
determine the serviceable radius based on the location information for the at least one serviceable point.

3. The geofencing server of claim 2, wherein the memory stores instructions that, when executed, further cause the processor to determine the preset candidate threshold value such that the serviceable radius determined based on the location information for the at least one serviceable point satisfies a specified service provision range.

4. The geofencing server of claim 3, wherein the memory stores instructions that, when executed, further cause the processor to receive information on the service provision range input to a portal web page using the communication circuit.

5. The geofencing server of claim 2, wherein the memory stores instructions that, when executed, further cause the processor to estimate the location information for the plurality of points based on the location information of an access point of a wireless network included in a wireless network positioning system database.

6. The geofencing server of claim 1, wherein the wireless network information includes:
wireless network information at a time of payment collected when the electronic device executes a payment process related to the point-of-interest, and
surrounding wireless network information collected at points around the point-of-interest according to a specified rule.

7. The geofencing server of claim 6, wherein the surrounding wireless network information includes main wireless network information selected among access points included in the wireless fingerprint information.

8. The geofencing server of claim 1, wherein the threshold value includes one of range information, a representative value, and an index value.

9. An electronic device comprising:
a memory;
a display;
a communication circuit; and
a processor connected to the memory, the display and the communication circuit,
wherein the memory stores instructions that, when executed, cause the processor to:

obtain point-of-interest information including a wireless fingerprint and a threshold value from a geofencing server, generate wireless network scan information based on a wireless communication signal received through the communication circuit, determine a distance value based on the wireless fingerprint and the wireless network scan information, and output a message though the display based on a result of a comparison of the distance value and the threshold value, wherein the wireless fingerprint includes a network identifier, average received signal strength information, and/or dispersion information of a received signal strength.

10. The electronic device of claim 9, further comprising: a low accuracy positioning device, wherein the memory stores instructions that, when executed, further cause the processor to generate wireless scan information based on a wireless communication signal received through a short-range communication circuit when a distance between location information determined using the low accuracy positioning device and location information included in the wireless fingerprint information is less than or equal to a specified value.

11. The electronic device of claim 9, wherein the memory stores instructions that, when executed, further cause the processor to calculate the distance value based on a report count value of an access point included in the wireless fingerprint information, a first received signal strength value of the access point included in the wireless fingerprint information, and a second received signal strength value of the access point included in the wireless network scan information.

12. The electronic device of claim 11, wherein the distance value becomes smaller as a difference between the first received signal strength value and the second received signal strength value decreases.

13. A method of setting a geofencing area in a geofencing server, comprising:

obtaining wireless network information collected at a plurality of points;

determining a serviceable radius based on wireless fingerprint information for a point-of-interest and the wireless network information;

determining a threshold value related to a first distance of the geofencing area based on the serviceable radius; and transmitting the threshold value to an electronic device, wherein the wireless fingerprint includes a network identifier, average received signal strength information, and/or dispersion information of a received signal strength.

14. The method of claim 13, wherein determining the serviceable radius includes:

calculating a distance value representing a second distance from the point-of-interest to a plurality of points based on the wireless fingerprint information and the wireless network information, estimating location information for the plurality of points, selecting at least one serviceable point among the plurality of points based on a result of a comparison of the distance value with a preset candidate threshold value, and determining the serviceable radius based on location information for the at least one serviceable point.

15. The method of claim 14, wherein determining the preset candidate threshold value includes:

adjusting the preset candidate threshold value such that the serviceable radius satisfies a specified service provision range; and replacing the preset candidate threshold value with the adjusted candidate threshold value.

16. The method of claim 14, wherein estimating the location information includes estimating location information for the plurality of points based on the location information of an access point of a wireless network included in a wireless network positioning system database.

17. The method of claim 13, wherein the wireless network information includes:

wireless network information at a time of payment collected when the electronic device executes a payment process related to the point-of-interest, and surrounding wireless network information collected at points around the point-of-interest according to a specified rule.

18. The method of claim 17, wherein the surrounding wireless network information includes main wireless network information selected among access points included in the wireless fingerprint information.

19. A method of providing a service based on a geofencing area in an electronic device, the method comprising:

obtaining point-of-interest information including a wireless fingerprint and a threshold value from a geofencing server;

generating wireless network scan information based on a wireless communication signal received by the electronic device;

determining a distance value based on the wireless fingerprint and the wireless network scan information; and outputting a message though a display based on a result of a comparison of the distance value and the threshold value, wherein the wireless fingerprint includes a network identifier, average received signal strength information, and/or dispersion information of a received signal strength.

20. The method of claim 19, wherein determining the distance value includes calculating the distance value based on a report count value of an access point included in the wireless fingerprint information, a first received signal strength value of the access point included in the wireless fingerprint information, and a second received signal strength value of the access point included in the wireless network scan information.

* * * * *